(12) United States Patent
Walker et al.

(10) Patent No.: US 6,710,822 B1
(45) Date of Patent: Mar. 23, 2004

(54) SIGNAL PROCESSING METHOD AND IMAGE-VOICE PROCESSING APPARATUS FOR MEASURING SIMILARITIES BETWEEN SIGNALS

(75) Inventors: Toby Walker, Kanagawa (JP); Hiroshi Matsubara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/673,232

(22) PCT Filed: Feb. 10, 2000

(86) PCT No.: PCT/JP00/00762
§ 371 (c)(1),
(2), (4) Date: Oct. 12, 2000

(87) PCT Pub. No.: WO00/48397
PCT Pub. Date: Aug. 17, 2000

(30) Foreign Application Priority Data

Feb. 15, 1999 (JP) .......................................... 11-036338

(51) Int. Cl.$^7$ ............................................. H04N 5/222
(52) U.S. Cl. ..................... 348/722; 348/180; 345/723
(58) Field of Search ................................. 348/722, 700, 348/180; 345/723–726; 382/170, 224, 232

(56) References Cited

U.S. PATENT DOCUMENTS

| 5,664,227 A | * | 9/1997 | Mauldin et al. ............. 395/778 |
| 5,872,564 A | * | 2/1999 | Snibbe et al. ............... 345/302 |
| 6,195,458 B1 | * | 2/2001 | Warnick et al. ............. 382/173 |
| 6,236,395 B1 | * | 5/2001 | Sezan et al. ................. 345/328 |
| 6,373,979 B1 | * | 4/2002 | Wang .......................... 382/165 |

FOREIGN PATENT DOCUMENTS

| EP | 0 711 078 | 5/1996 |
| EP | 0 907 147 | 4/1999 |
| JP | 7-193748 | 7/1995 |
| JP | 8-181995 | 7/1996 |
| JP | 10-257436 | 9/1998 |

\* cited by examiner

*Primary Examiner*—Victor R. Kostak
(74) *Attorney, Agent, or Firm*—Frommer Lawrence & Haug LLP; William S. Frommer; Dennis M. Smid

(57) ABSTRACT

In step S1 the image-voice processing apparatus 10 divides segments into sub-segments that will be candidates for r segments, and in step S2 groups together similar sub-segments out of the sub-segments obtained. And in step S3 the image-voice processing apparatus 10 selects object groups for signatures, and then after selecting in step S4 a r segment from each of the groups selected, computes in step S5 the weight for each of the r segments obtained.

15 Claims, 6 Drawing Sheets

SIGNAL PROCESSING METHOD AND IMAGE-VOICE PROCESSING APPARATUS FOR MEASURING SIMILARITIES BETWEEN SIGNALS

TECHNICAL FIELD

This invention relates to a signal processing method for measuring the similarity between mutually different arbitrary segments constituting signals and a image-voice processing apparatus for measuring the similarities between mutually different arbitrary image and/or voice segments constituting video signals.

BACKGROUND ART

There is a case where it is desirable to search and reproduce interesting parts and often desired parts from an image application composed of massive different image data, for example a TV program recorded in video data.

In searching video data and other multimedia data, essentially unlike data used in many computer application, one cannot expect to find exactly identical data and similar ones are searched. Therefore almost all the technologies out of those relating to search on the multimedia data are based on similarity-based search as described in "G. Ahanger and T. D. C. Little, A survey of technologies for parsing and indexing digital video, J. of Visual Communication and Image Representation 7:28-4. 1996."

In such search technologies based on similarity, the similarity of the contents is measured numerically in the first place. And in this technology, the measurements of similarity are used to rank those data of descending levels of similarity beginning with the highest level based on the standard of measuring similarity with the subject item. In a list obtained thereby, the most similar data themselves appear near the top of the list.

In such a search method based on the contents of multimedia data, image data, voice data, and essentially the video processing technologies based on signal processing are used in the first place to extract a low level feature of multimedia data. And in this search method, the inventors extracted low level features to find a standard of measuring similarity required for searches based on similarity.

Studies on searches based on the contents of multimedia data are often focussed at first on images (still images) searches. In such studies, the similarity among images is measured by a large number of low level image features such as color, texture, shape, etc.

And lately studies on searches based on the contents of video data have also been conducted. In the case of video data, identical parts in long video data are usually searched. Therefore in most technologies related to CBR (Contents Base Retrieval), video data are at first divided into a stream of frames called segments. Those segments are the subject of searches based on similarity. As for the existing method for dividing video data into segments, for example, usually a shot detection algorithm is used to divide video data into so-called shots as described in "G. Ahanger and T. D. C. Little, A survey of technologies for parsing and indexing digital video, J. of Visual Communication and Image Representation 7:28-4. 1996." And in such search, the features that enable comparison based on similarity from the shot obtained are extracted.

However, it is difficult to identify the remarkable features of shots and detect features that enable to compare shots based on similarity. Therefore, the existing approach to search based on the contents of video data was, in place of the above-mentioned method, usually to extract representative frames from each shot and search for those representative frames. Those representative frames are generally called "key frames." In other words, search technologies based on the contents of shot are attributed to search technologies based on the contents of image by comparing shot key frames. For example, when colour histograms are extracted from key frames for each shot, and the histograms of these key frames can be used to measure the similarity of two shots. This approach is also effective for selecting the key frame.

A simple approach is to regularly select a fixed frame from each shot. Another method for selecting a large number of frames is to use the frame-difference described in "B. L. Yeo and B. Liu, Rapid scene analysis on compressed video, IEEE Transactions on Circuits and Systems for Video Technology, vol.5, no.6, pp.533, December 1995", the motion analysis described in "W. Wolf, Key frame selection by motion analysis, Proceedings of IEEE Int'l Conference on Acoustic, Speech and Signal Proceeding, 1996", and the clustering technology described in "Y. Zhuang, Y. Rui, T. Huang and S. Mehrotra, Adaptive key frame extraction using unsupervised clustering, Proceedings of TEEE Int'l Conference on Image Proceeding, Chicago, Ill. Oct. 4–7 1998."

Incidentally, the above-mentioned search technology based on key frames is limited to searches based on the similarity of shots. However, for example, since a typical 30-minutes TV program contains hundreds of shots, in the above-mentioned prior search technology a tremendous number of extracted shots need to be checked and searching such a huge number of data was quite a burden.

Therefore, it was necessary to mitigate the burden by comparing the similarities among, for example, scenes and programs in which segments are grouped together based on a certain correlation and other image and voice segments longer than shots.

However, the prior search technologies have not met the requirements for, for example, searching segments similar to specific commercials or, searching scenes similar to a scene consisting of related group of shots describing an identical performance in a TV program.

As mentioned above, almost no published studies devoted to comparisons based on the similarity of segments at higher levels than shots have been found. The only study of this kind is "J. Kender and B. L. Yeo, Video Scene Segmentation via Continuous Video Coherence, IBM Research Report, RC21061, Dec. 18, 1997". This study provides a method for comparing the similarities between two scenes. The search technology in this study classifies all the shots of video data into categories and then counts the number of shots in every scene attributed to each category. The result obtained is a histogram that can be compared by the standard criteria of comparing similarity. It is reported that the study was successful to some extent in comparing similarity among similar scenes.

However, this method requires the classifications of all the shots of video data. Classifying all the shots is a difficult task and usually needs a technology requiring an enormous amount of computation.

Even if this method could exactly classify all the shots, it did not take into account the similarity between categories, and therefore the method could give confusing results. For example, suppose that a shot of video data are divided into three categories A, B, and C, a scene X has no shot of the categories B and C but has two shots of the category A, and another scene Y has no shot of the categories A and C but has two shots of the category B. In this case, according to the method, no similarity is found to exist between the scene X and the scene Y. However, if the shots in the category A and the category B are mutually similar, the similarity value should not be zero. In other words, the fact that in this method no similarities of shots themselves are taken into account sometimes leads to such a misjudgment.

DISCLOSURE OF THE INVENTION

This invention was made in view of such a situation, and has an object of solving the problems mentioned above of the prior search technologies, and of providing a signal processing method and an image-voice processing apparatus for search based on the similarity of segments of various levels in various video data.

The signal processing method related to the present invention designed to attain the above object is a signal processing method that extracts signatures defined by the representative segments which are sub-segments that represent the contents of segments constituting signals supplied out of the sub-segments contained in the segments and a weighting function that allocates weight to these representative segments including a group selection step that selects object groups for the signatures out of the groups obtained by a classification based on an arbitrary attribute of the sub-segment, a representative segment selection step that selects a representative segment out of the groups selected in the group selection step, and a weight computing step that computes the weight for the representative segment obtained in the selection step.

The signal processing method related to the present invention extracts the signature related to the segment.

The image-voice processing apparatus related to the present invention designed to attain the above object is an image-voice processing apparatus that extracts signatures defined by the representative segments which are image and/or voice sub-segments that represent the contents of the image and/or voice segments constituting video signals supplied out of the image and/or voice sub-segments contained in the image and/or voice segments and a weighting function that allocates weight to these representative segments including an execution means that selects object groups for the signatures out of the groups obtained by a classification based on an arbitrary attribute of the image and/or voice sub-segments, selects a representative segment from these selected groups and computes a weight for the representative segment obtained thereby.

The image-voice processing apparatus related to this invention thus configured extracts signatures relating to the image and/or voice segment.

BEST MODE FOR CARRYING OUT THE INVENTION

A specific mode of carrying out this invention is hereinafter described in details with reference to the drawings.

A mode for carrying out this invention is an image voice processing apparatus that automatically extracts data representing arbitrary sets within video data in order to search and extract automatically desired contents from the video data. Before describing specifically this image voice processing apparatus, video data forming the subject matter of this invention will be described to begin with.

Figure 1:
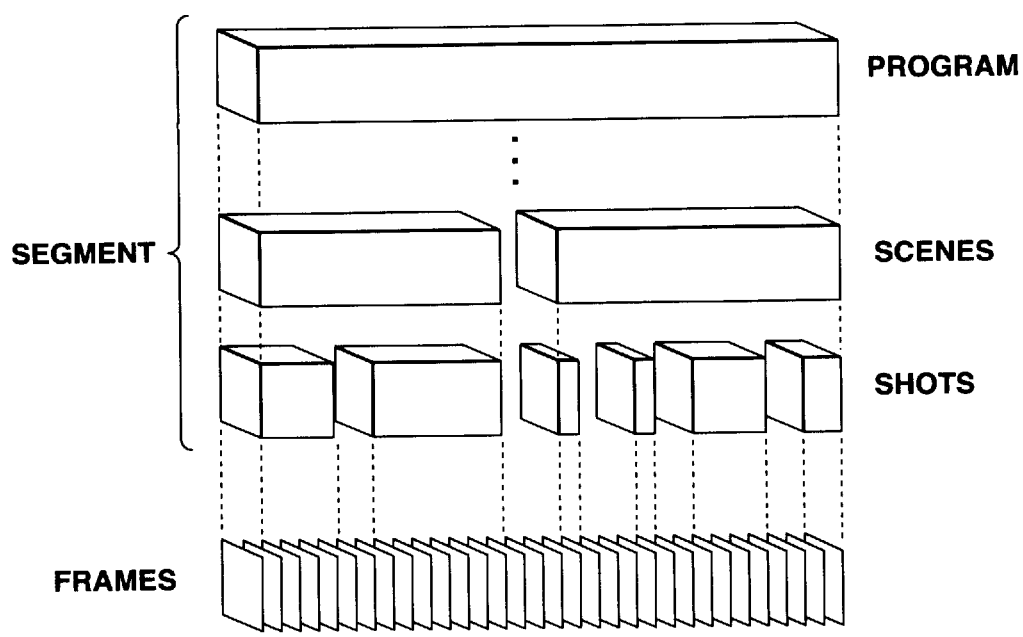
FIG. 1 is a drawing describing the structure of video data applied in this invention, and describing the structure of modeled video data.

The video data forming the subject matter of this invention are turned into a model as shown in FIG. 1 and have a hierarchical structure layered by such levels as frame, segment and program. In other words, video data are composed of a program at the top layer and representing the whole video data, a stream of frames at the bottom layer and segments composed of multiple layers in between.

As for segments in video data, there are segments formed by a stream of successive frames, those that assemble streams of such frames as a scene, and then those that assemble such scenes by a certain association. And in a broad sense, a single frame can be considered as a type of segment.

In other words, the segment in video data is a generic name independently given from the height of the relevant layer and is defined as a certain successive part of a stream of video data. Of course, a segment may be formed by a stream of successive frames mentioned above, or an intermediary structure having a certain meaning such as an intermediary structure to a scene. On the other hand, for example, if any segment X is completely contained in a different segment Y, the segment X is defined as a sub-segment of the segment Y.

Such video data in general include both image and voice data. In other words, in these video data the frames include single still image frames and voice frames representing voice information that have been typified during a short period of time such as several tens to several hundreds of milliseconds/length.

Segments also include image segments and voice segments. In other words, segments include so-called shots each consisting of a stream of image frames successively shot by a single camera, or image segments of scenes grouped together into certain meaningful units using a feature representing this characteristic. Furthermore, segments include voice segments that have been formed by being defined by periods of silence within video data detected by a generally known method, those that have been formed by a stream of voice frames classified into a small number of categories such as for example voice, music, noises, silence, etc. as described in "D. Kimber and L. Wilcox, Acoustic Segmentation for Audio Browsers, Zerox Parc Technical Report,"

those determined by means of voice cut detection that detects important changes in certain features between two successive voice frames as described in "S. Pfeiffer, S. Fischer and E. Wolfgang, Automatic Audio Content Analysis, Proceeding of ACM Multimedia 96, November 1996, pp21–30," and those that grouped streams of voice frames into meaningful sets based on a certain feature.

The image voice processing apparatus shown here as a mode for carrying out this invention automatically extracts signatures which are general feature characterizing the contents of segments in the above-mentioned video data and compares at the same time the similarity between two signatures. It can be applied to both image segments and voice segments. The standard of measuring similarity obtained thereby provides a general purpose tool for searching and classifying segments.

The following is an explanation about the signature. The signature generally identifies certain objects and consists of some data that identify the objects with a high precision by means of a smaller quantity of information than the objects themselves. For example, as a signature for human beings, finger prints may be mentioned as a type thereof In other words, the comparison of similarity of two sets of finger prints found on a body enables to determine precisely whether a same person has left the finger prints on it.

Similarly, a signature related to image segments and voice segments is a datum that enables to distinguish image segments and voice segments. This signature is given as a weighted set of the above-mentioned sub-segments obtained by dividing a segment. For example, a signature X related to a segment X is, as mentioned below, defined as a pair <R, W> consisting of a representative segment R composed of sub-segments representing the segment X and a weighting function W that allocates weights to each element of this representative segment R.

For the purpose of the explanation below, the term "r frame (representative frame)" is expanded to refer to the representative segment as "r segment." And accordingly the set of all the r segments including a signature is called "the r segment of the signature." And the type of r segment is called the r type of segment. And when it is necessary to indicate the r type of signature, the relevant type should precede the word "signature." For example, an image frame signature represents a signature whose r segment consists entirely of image frames. And a shot signature represents a signature whose r segment is the above-mentioned shot. On the other hand, a segment described by a signature S is referred to as the object segment. For signature, an image segment, a voice segment or a r segment that includes a set of both of these segments may be used.

Such a signature has some features representing effectively segments.

In the first place, a signature describes not only shots and other short segments as the most important feature, but also enables to describe much longer segments such as the whole of a scene or all the video data.

And the r segments required to characterize long object segments are normally limited in number. In other words, a signature enables to characterize segments by a small amount of data.

In addition, in a signature, the weight allocated to each r segment shows the importance or correlation of each r segment and thus enables to identify object segments.

Moreover, in view of the fact that not only frames but also shots, scenes and any other segments can be used as r segments, a signature is nothing but a generalized concept resulting from the expansion of the so-called "key frame."

When a segment can be broken down into a set of more simple sub-segments, these sub-segments can be used as r segments.

Such a signature can be formed at the discretion of users through a computer-assisted user interface, but in most applications it is desirable that the same would be extracted automatically.

The following is a description of some of actual examples of signature.

Figure 2:
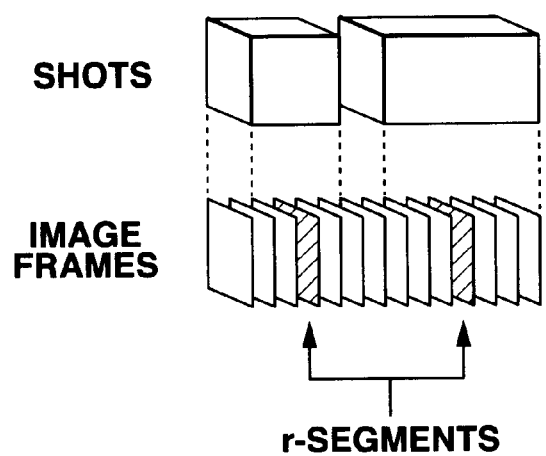
FIG. 2 is a drawing describing image frame signatures related to shots.

In the first place, the image frame signature of shots is, as shown in FIG. 2, a signature whose r segments are still pictures. A method of creating such a signature is to use the key frame of each shot as a r segment, and to use the proportion of image frames within shots matching more or less to the relevant key frame to the total image frames within the shot as a weight.

Figure 3:
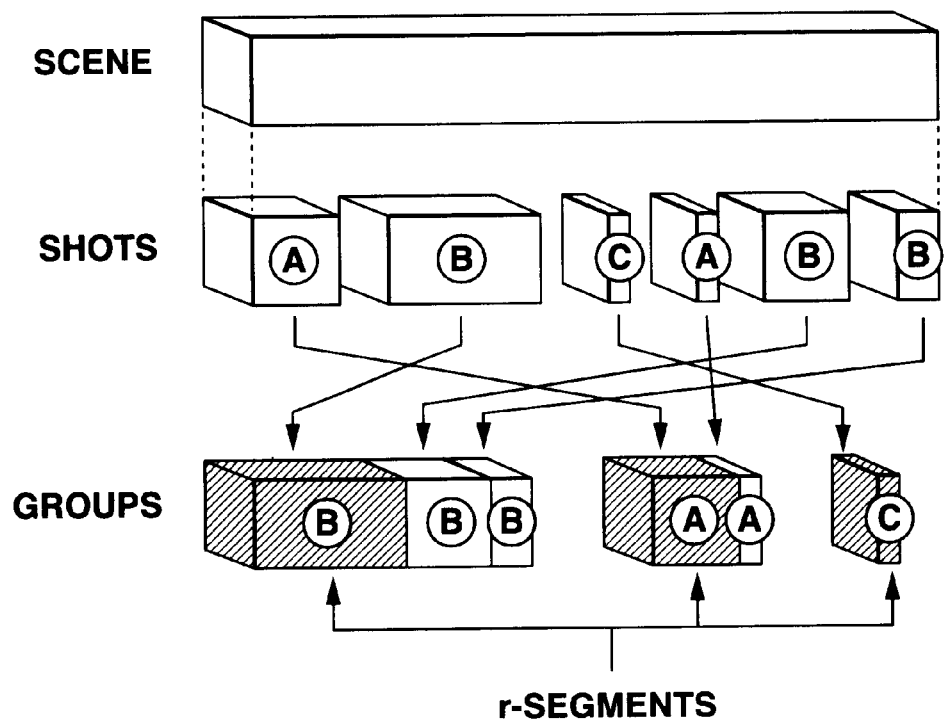
FIG. 3 is a drawing describing shot signatures related to a scene.

The shot signature of a scene is, as shown in FIG. 3, a signature whose r segment is a shot. Let's suppose here that a shot in a scene can be broken down into n number of groups. In this case, a signature consisting of n number of r segments can be formed. In other words, for each group a certain shot is chosen to behave as r segment. Here, each r segment may be weighted, as described below, according to the proportion of the number of shots forming part of each group to the total number of shots that constitute a scene.

Figure 4:
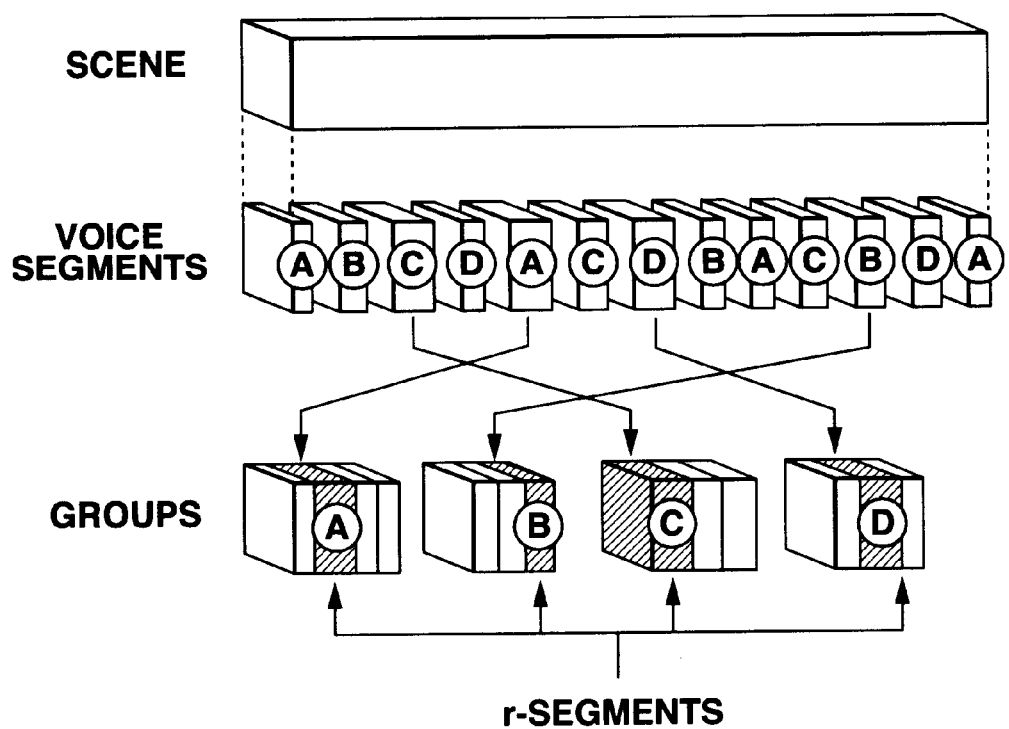
FIG. 4 is a drawing describing voice segment signatures related to a scene.

In addition, the usages of signatures are not limited to that of visual information. As shown in FIG. 4, the voice segment signature in a scene can be mentioned as an example of signature. Here, the voice segment signature of s scene means to use sets of voice segments as r segments. For example, let's imagine a scene in which a plurality of persons are talking. In this case, if the speaker can be distinguished automatically, short speech segments of each speaker can be used as r segments.

Figure 5:
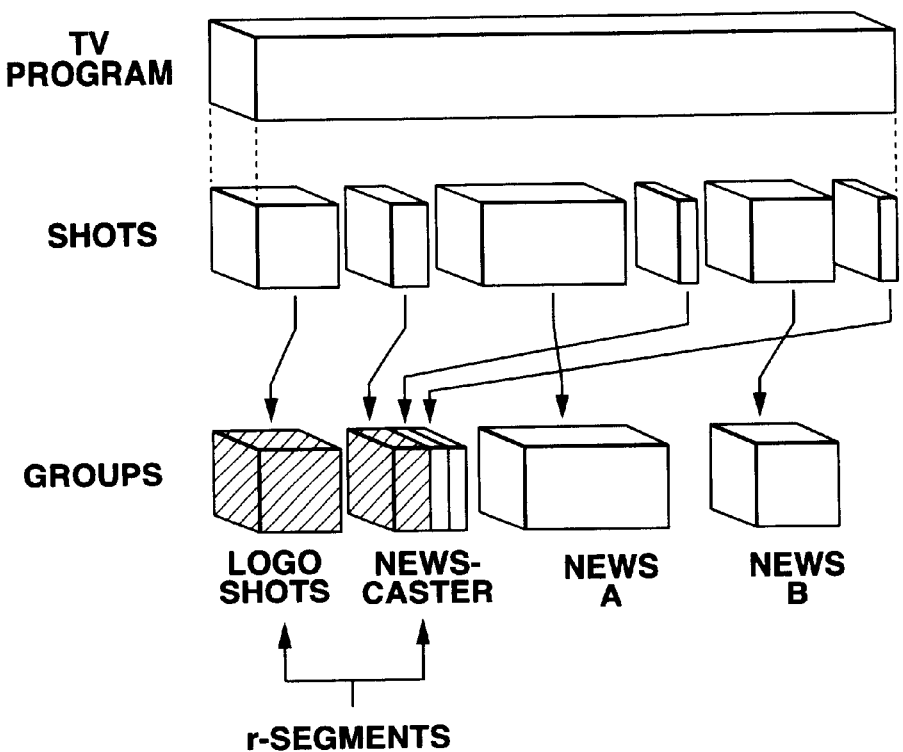
FIG. 5 is a drawing describing shot signatures related to a TV program.

And the signature is not only useful for describing short segments but can also be used to describe the whole video program. For example, it will be possible to distinguish a specific TV program from the other TV programs by adequately choosing a plurality of shots. Such shots are repeatedly used in the above-mentioned TV program. For example, the beginning logo shot in a news program and a shot showing the news caster as shown in FIG. 5 correspond to them. In this case, as weighting shows the importance of shots, it is appropriate to allocate the same weight to the logo shot and the news caster shot.

Figure 6:
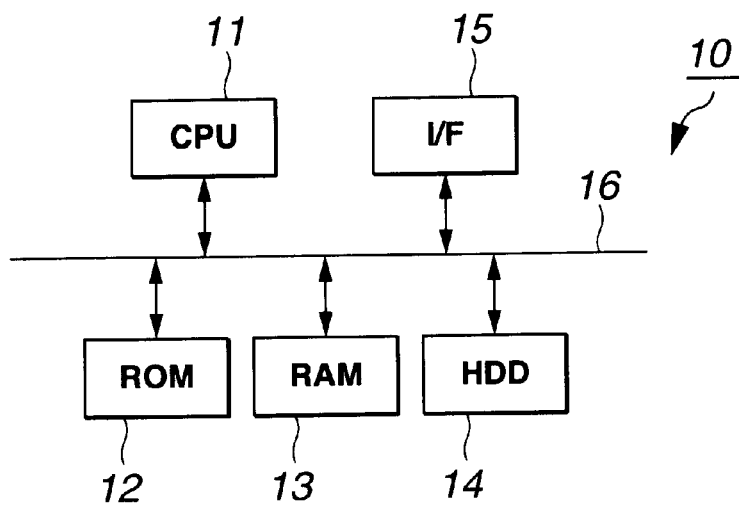
FIG. 6 is a block diagram describing the structure of an image-voice processing apparatus shown as a mode of carrying out this invention.

An image voice processing apparatus 10 that extracts automatically such signatures and compares the similarity of two signatures controls as shown in FIG. 6 the operation of various components, and comprises a CPU (Central Processing Unit) 11 constituting a means of execution that executes a program stored in a ROM 12 and extracts signatures, a ROM (Read Only Memory) 12 which is a read only memory reserved to store the program to be executed by the CPU 11 for the purpose of extracting signatures and numerical values used, a RAM (Random Access Memory) 13 or a memory that functions as a working area for storing sub-segments obtained by dividing the inputted segments and r segments, a HDD (Hard Disk Drive) 14 that displays signatures prepared and other items depending on the requirement of the moment, records and/or reproduces the same on or from the recording media, an interface (hereinafter abbreviated as "I/F") 15 that inputs segments from which signatures are sought and outputs a set of r segments and the weight of each of these r segments as signatures, these components being mutually connected by a bus.

Figure 7:
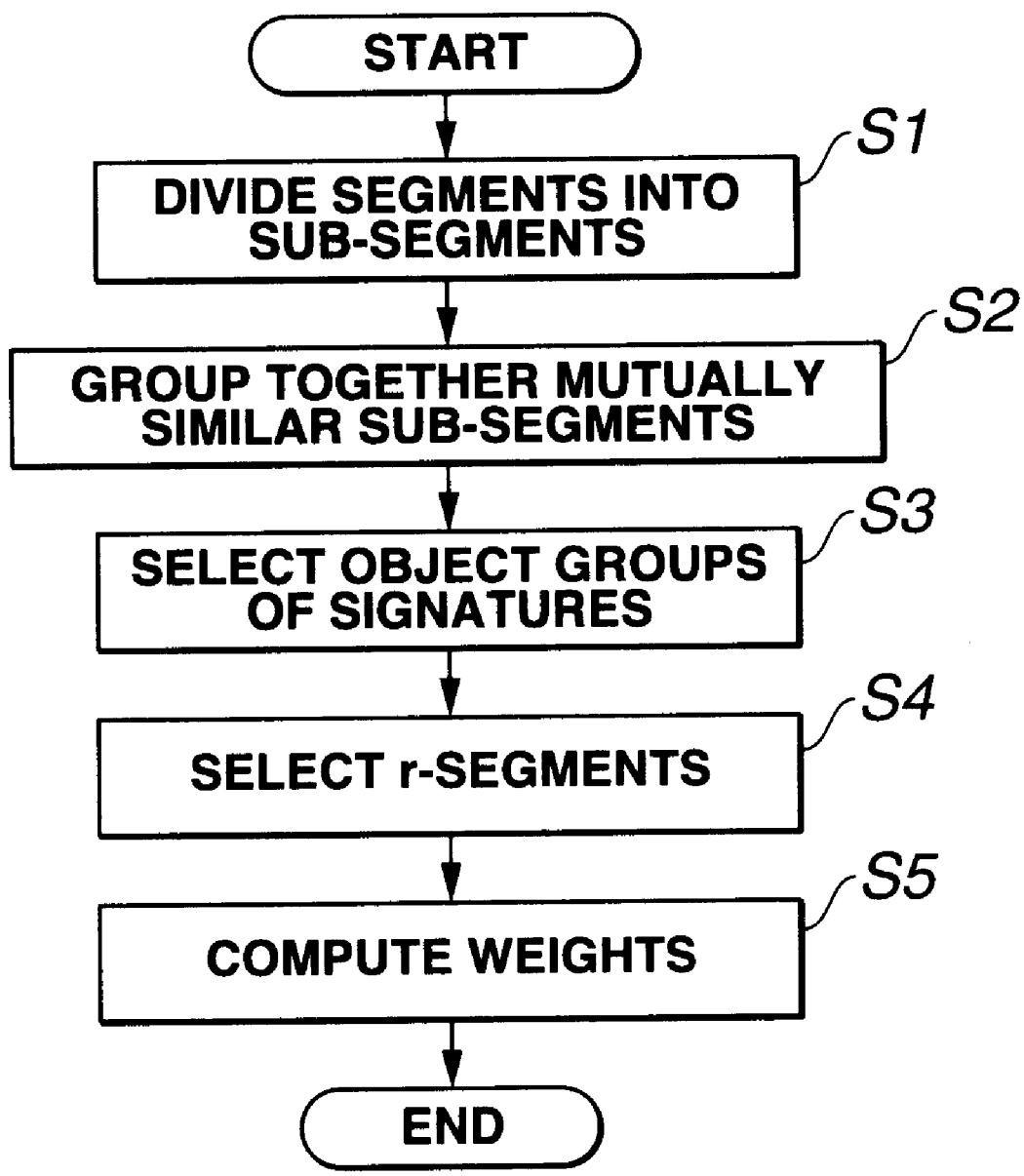
FIG. 7 is a flow chart describing a series of steps for extracting signatures in the image-voice processing apparatus.

This image voice processing apparatus 10 extracts signatures as the CPU 11 reads and executes a program stored in the ROM 12 to perform a series of processing shown in FIG. 7.

To begin with, the image voice processing apparatus 10 divides the segments inputted through I/F 15 into sub-segments in step S1. The sub-segments obtained as a result of fragmentation here become candidate r segments that are candidates for r segments.

The image voice processing apparatus 10 does not establish any particular restrictions on the method of dividing segments into sub-segments. Any applicable method can be adopted. These methods depends largely on the type of sub-segments used. Here a method of breaking down a segment into a set of smaller sub-segments is used. In specific terms, the image voice processing apparatus 10 can be easily broken down if, for example, the r segments are image frames, and the set of all the image frames (still pictures) in the segment becomes a candidate set of sub-segments. And when the r segments are shots, the image-voice processing apparatus 10 uses for example one of the existing algorithms described in "B. Furht (Editor), Handbook of Multimedia Computing, CRC Press, 1998" and "J. Kender and B. L. Yeo, Video Scene Segmentation via Continuous Video Coherence, IBM Research Report, RC21061, Dec. 18, 1997" to fragment segments into sub-segments. And when the sub-segments are voice segments, the image voice processing apparatus 10 uses for example an audio fragmentation method as described in "D. Kimber and L. Wilcox, Acoustic Segmentation for Audio Browsers, Zerox Parc Technical Report" and "S. Pfeiffer, S. Fischer and E. Wolfgang, Automatic Audio Content Analysis, Proceeding of ACM Multimedia 96, November 1996, pp21–30" to detect the borders among the sub-segments.

Thus, the image voice processing apparatus 10 divides segments into sub-segments without depending on the type of segments. Incidentally, when the segments are frames, the image-voice processing apparatus needs not proceed to this fragmentation process.

Then in step S2, the image-voice processing apparatus 10 groups together mutually similar sub-segments. In other words, as groups of mutually similar sub-segments are considered to show best the contents of the segments to which they relate, the image-voice processing apparatus 10 detects and groups together mutually similar sub-segments. Incidentally, the term "mutually similar sub-segments" refer to sub-segments with a small value of standard of measuring dissimilarity in the feature range of each sub-segment described below.

Like in step S1, the image-voice processing apparatus 10 establishes no particular restrictions to the method of grouping together mutually similar sub-segments, and any applicable method can be adopted. The image-voice processing apparatus uses for example the well-known k-means-clustering method, k-medoids algorithm method and other clustering algorithms described in "L. Kaufmann and P. J. Rousseeuw, Finding Groups in Data: An Introduction to Cluster Analysis, John Wiley and Sons, 1990" to form similar groups within a set of candidate r segments. Most of these clustering algorithms need only the dissimilarity measuring standard on features extracted from sub-segments described below to compare two sub-segments. The image-voice processing apparatus 10 can use any well-known measuring standards based on similarity relative to image frames and shots.

Here is an explanation on feature. The term "feature" shows the feature of a segment and also a segment attribute that provides data for measuring the similarity among different segments. The image-voice processing apparatus does not depend on specific details of any feature. However, the features considered effective for use with the image-voice processing apparatus 10 include, for example, image features, voice features, and common image-voice features described below.

There are a large number of known image features. They include, for example, color features (histograms) and image correlation.

Color in image is known to be an important aspect for judging whether two images are similar or not. The use of color histogram to measure image similarity is well-known as described for example in "G. Ahanger and T. D. C. Little, A survey of technologies for parsing and indexing digital video. J. of Visual Communication and Image Representation 7:28-4, 1996." A color histogram divides, for example, HSV, RGB and other 3-dimensional color spaces into n regions and computes the relative proportion of pixels in images in each region. And the resulting information yields an n dimensional vector. For compressed video data, color histograms can be extracted directly from compressed data as described for example in U.S. Pat. No. 5,708,767.

In case where a histogram is to be extracted as a feature from sub-segments, image-voice processing apparatus 10 samples the original YUV color space with two bits per color channel and gives a histogram of length $2^{2 \cdot 3} = 64$.

Such histograms capture the overall tone color of an image, but they lack time information. Therefore, the image-voice processing apparatus 10 can compute image correlation as another image feature. The interleaved structure of similar segments provides a strong indicator of a scene structure. For example, in a scene of dialogue, the camera position alternates between the two speakers. But the camera normally returns to a nearly same position when the same speaker is to be shown again. To detect such occurrences, the inventors have found that computing gray-scale correlation is a good indicator of segment similarity. Therefore, the image-voice processing apparatus 10 sub-samples the image to a gray scale image of size M-by-N, where M and N are both small values; for example 8×8. In other words, the small gray scale image is interpreted as a feature of length MN.

Another feature different from the image feature mentioned above is one related to voice. Hereafter this feature shall be referred to as "voice feature." The term "voice feature" means a feature that can show the contents of voice segments. Voice features include, for example, frequency analysis, pitch and level. These voice features are known by various documents.

One of such voice features is the distribution of frequency information in a single voice frame that can be obtained by means of a frequency analysis including the Fourier transform. To show the distribution of frequency information throughout a single voice sub-segment, the image-voice processing apparatus 10 can use, for example, the components of FFT (Fast Fourier Transform), frequency histogram, power spectrum and other features.

In addition, the image voice processing apparatus 10 can use pitch data including the average pitch and the maximum pitch and voice levels including the average voice level and the maximum voice level as effective voice features representing voice sub-segments.

Another feature that can be mentioned here is the common image-voice feature. This is neither image feature nor voice feature, but this gives useful information to show the features of sub-segments in the image-voice processing apparatus 10. The image-voice processing apparatus 10 uses segment length and activity for these common image-voice features.

The image-voice processing apparatus 10 can use segment length as a common image-voice feature. This term "segment length" means the length of time of a segment. Generally speaking, a scene has a rhythm feature proper to the scene. This rhythm feature shows up in the form of changes in the segment length within the scene. For example, rapidly successive short segments represent a commercial. On the other hand, segments in a dialogue scene are longer than those of a commercial. And a dialogue scene has a feature in that segments mutually joined together are mutually similar. The image voice processing apparatus 10 can use segment length having such a feature as a common image-voice feature.

And the image-voice processing apparatus 10 can use activity as a common image-voice feature. The term "activity" is an indicator indicating to what extent the contents of the relevant segment is felt dynamic or static. When they are visually dynamic, for example, activity represents the rapidity with which the camera moves along the object or the rapidity with which the object being shot changes.

This activity is computed indirectly by measuring the average value of the dissimilarity among frames of color histogram and other features. Now, if the standard of measuring dissimilarity for the feature F measured between the frame i and the frame j is defined as $d_F(i, j)$, the image activity $V_F$ will be defined as shown in the following formula (1).

$$V_F = \frac{\sum_{i=b}^{f-1} d_f(i, i+1)}{f - b} \quad (1)$$

In this formula (1), b and f are the frame numbers of the first and last frames in a segment. In specific terms, the image-voice processing apparatus 10 uses for example the above-mentioned histogram to compute image activity $V_F$.

The image voice processing apparatus 10 extracts these features from sub-segments and detects mutually similar sub-segments by means of a clustering algorithm and groups them together.

In the meanwhile, the standard of measuring dissimilarity which is a function that computes actual values of measuring the similarity between two sub-segments will be discussed later.

Then in step S3, the image-voice processing apparatus 10 selects the object groups of signature from among the similar groups obtained by grouping together sub-segments. Here, the image-voice processing apparatus 10 takes into account the number of sub-segments classified into various groups as it determines the number of r segments required to precisely characterize segments.

In specific terms, the image-voice processing apparatus 10 sets a threshold value for the number of sub-segments existing in each group in order to select the object groups for signature.

In the image-voice processing apparatus 10, this threshold value is normally given as a ratio of the number of sub-segments contained in a group to the total number of sub-segments. In other words, the image-voice processing apparatus 10 chooses the groups with a number of elements in excess of the threshold value from among the groups obtained.

On the other hand, the image-voice processing apparatus 10 can set an arbitrary constant k as the number of r segments. In this case, the image-voice processing apparatus 10 can arrange all the groups in the order of number of elements contained therein, and chooses only k number of groups in the order of descending magnitude of the number of elements as the object groups for signature.

In this way, the image-voice processing apparatus 10 chooses the object groups for signature from among the groups.

Then in step S4 the image-voice processing apparatus 10 chooses r segments. In other words, the image-voice processing apparatus 10 chooses only a sub-segment from among the sub-segments constituting each of the groups chosen in step S3, and designates the sub-segment as r segment serving as an element for signature.

In specific terms, the image-voice processing apparatus 10 can choose any one sub-segment from each group. Or as a more refined approach, the image-voice processing apparatus 10 can choose the most similar sub-segment to the average value or median of sub-segments in each group as r segment.

In this manner, the image-voice processing apparatus 10 chooses a r segment from each of the chosen object group.

And in step S5 the image-voice processing apparatus 10 computes the weight of each r segment. The image-voice processing apparatus 10 sets such weight as a ratio of the number of sub-segments contained in groups corresponding to each r segment to the total number.

The image-voice processing apparatus 10 executes a series of such processes to all the segments to extract signatures related to various segments.

Figure 8:
FIG. 8 is a drawing describing a scene applied for describing in specific terms a series of steps shown in FIG. 7.

In order to describe more specifically such a series of processes, an example of extracting shot signatures related to a scene shown in FIG. 8 will be described below.

This scene shows a scene of two persons talking each other, and begins with a shot showing both of the two speakers followed by shots in which the two persons appear alternatively as speakers.

In such a scene, in step S1 of FIG. 7 the image-voice processing apparatus 10 divides the scene into shots which are sub-segments. In other words, in this case, the image-voice processing apparatus 10 uses a shot detection method to detect nine different sub-segments and fragment them as shown in FIG. 8.

Then in step S2 of FIG. 7, the image-voice processing apparatus 10 classifies and groups together mutually similar sub-segments. In other words, in this case, based on the visual similarity of shots, the image-voice processing apparatus 10 classifies them into three groups: the first group consisting of only the first shot showing both of the two persons, the second and third groups containing four shots respectively for each speaker.

And in step S3 of FIG. 7, the image-voice processing apparatus 10 chooses groups necessary to characterize the scene. Here, because of the importance of each of all the groups, first to third, shown in FIG. 8, the image-voice processing apparatus 10 decides to use all the first to third groups for shot signatures.

And in step S4 of FIG. 7, the image-voice processing apparatus 10 chooses a shot of each group as r segments. Here, the image-voice processing apparatus 10 chooses three shots shown in FIG. 9 respectively from the first to third groups as r segments.

And in step S5 of FIG. 7, the image-voice processing apparatus 10 computes weight corresponding to the proportion of the number of shots contained in each group for each of the first to third groups. In this case, as the first group contains a shot as its element and the second and third groups have respectively four shots among the nine shots shown in FIG. 8, the image-voice processing apparatus 10 can give a weight of 1/9, 4/9 or 4/9 for each of the first to third groups.

Figure 9:
FIG. 9 is a drawing describing the r segments selected from the scene shown in FIG. 8.

Thus, the image-voice processing apparatus 10 takes r segments and weights shown in FIG. 9 as signatures related to the scene shown in FIG. 9.

Then, the method of comparing the similarity of two segments by using signatures extracted will be described. In specific terms, the similarity of two segments is defined as a similarity of signatures based on r segments. Here in actual application, it is necessary to pay attention to the fact that the standard of measuring dissimilarity mentioned above or the standard of measuring similarity is defined.

Here, $P=((r_{p1}, w_{p1}), \ldots, (r_{p1}, w_{p1}))$ and $Q=((r_{q1}, w_{q1}), \ldots, (r_{q1}, w_{qn}))$ are respectively taken as signatures. As mentioned above, the expression (r, w) refers to r segments and weighting functions incidental thereto. And $d_R(r_1, r_2)$ shall be the standard of measuring dissimilarity for the two r segments.

Now, here is an explanation on the standards of measuring dissimilarity. The standard of measuring dissimilarity indicates that the two segments are similar when its value is small, and that they are dissimilar when its value is large. The standard of measuring dissimilarity $d_R(r_1, r_2)$ must satisfy the relation given by the following formula (2).

$d_R(r_1, r_2)=0$ (When $r_1=r_2$)

$d_R(r_1, r_2) \geq 0$ (With respect to all $r_1=r_2$)

$d_R(r_1, r_2)=d_R(r_2, r_1)$ (With respect to all $r_1=r_2$) (2)

Incidentally, some standards for measuring dissimilarity are applicable only to certain specific features. However, as described in "G. Ahanger and T. D. C. Little, A survey of technologies for parsing and indexing digital video, J. of Visual Communication and Image Representation 7:28-4, 1996" and "L. Kaufman and P. J. Rousseeuw, Finding Groups in Data: An Introduction to Cluster Analysis, John-Wiley and Sons, 1990," generally speaking many standards for measuring dissimilarity are applicable for measuring similarity for features shown as points in n dimensional space. Concrete examples are Eucledean distance, inner product, and L1 distance. In view of the fact that L1 distance operates particularly effectively in various features including histogram, image correlation and features, the image-voice processing apparatus introduces L1 distance. Here, when two n dimensional vectors are represented by A and B, the L1 distance between A and B or dL1 (A,B) will be given by the following formula (3):

$$d_{L1}(A, B) = \sum_{i=1}^{n} |A_i - B_i| \quad (3)$$

Here, the subscript i represents the respective first element of n dimensional vectors A and B.

As standards for measuring dissimilarity, several others are known in addition to the one mentioned above. But their detailed description is omitted here. The image-voice processing apparatus 10 uses the CPU11 mentioned above to measure the similarity between two signatures represented by the standards for measuring dissimilarity described above, and defines the similarity of object segments for these two signatures based on the similarity of these r segments by any one of the following methods.

In the first place, in the first method, the image-voice processing apparatus 10 uses the weighted minimum value shown in the following formula (4) to compute the distance between the two signatures.

$$\min\left(\left(\sum_{i=1}^{m} w_{pi} \min_{1 \leq j \leq n} d_r(r_{pi}, r_{qj})\right), \left(\sum_{i=1}^{n} w_{qj} \min_{1 \leq j \leq n} d_r(r_{pi}, r_{qj})\right)\right) \quad (4)$$

And as the second method, the image-voice processing apparatus 10 uses the weighted average distance shown in the following Formula (5) to compute the distance between the two signatures.

$$\min\left(\left(\sum_{i=1}^{m} w_{pi} \frac{1}{n}\sum_{j=1}^{n} d_r(r_{pi}, r_{qj})\right), \left(\sum_{j=1}^{n} w_{qj} \frac{1}{m}\sum_{i=1}^{m} d_r(r_{pi}, r_{qj})\right)\right) \quad (5)$$

Then as the third method, the image-voice processing apparatus 10 uses the weighted mean distance shown in the following formula (6) to compute the distance between the two signatures.

$$\min\left(\left(\sum_{i=1}^{m} w_{pi} \operatorname*{median}_{1 \leq j \leq n} d_r(r_{pi}, r_{qj})\right), \left(\sum_{i=1}^{n} w_{qj} \operatorname*{median}_{1 \leq j \leq n} d_r(r_{pi}, r_{qj})\right)\right) \quad (6)$$

Furthermore, as the fourth method, the image-voice processing apparatus 10 uses the Earth mover distance shown in the following formula (7) used in the case of color short messages for still pictures in application of the distance measuring method described in "Y. Rubner, C. Tomasi and L. J Guibas, A Metric for Distributions with Applications to Image Databases, Proceedings of the 1998 IEEE International Conference on Computer Vision, Bombay, India, January 1998." In this method, m×n cost matrix C is defined. Here $C_{11}$ is a value that minimizes the function.

$$\sum_{i=1}^{m}\sum_{j=1}^{n} C_{ij} d_R(r_{pi}, r_{qj}) \quad (7)$$

Incidentally, for applying this formula (7), the restrictive conditions shown in the following formula (8) must be fulfilled.

$C_{ij} \geq 0$ for $1 \leq i \leq m$, $1 \leq j \leq n$ (8)

$\sum_{i=1}^{m} C_{ij} \leq w_{qj}$  $1 \leq i \leq n$ $\sum_{j=1}^{n} C_{ij} \leq w_{pj}$  $1 \leq j \leq n$ $\sum C_{ij} = \min\left(\sum_{i=1}^{m} w_{pi}, \sum_{j=1}^{n} w_{qj}\right)$ The image-voice processing apparatus 10 can use an algorithm described in "Y. Rubner, C. Tomasi and L. J.

Guibas, A Metric for Distributions with Applications to Image Databases, Proceedings of the 1998 IEEE International Conference on Computer Vision, Bombay, India, January 1998" to detect a value of $C_{11}$ that minimizes the function shown in formula (7) according to this formula (8). In the image-voice processing apparatus 10, the distance between two signatures is defined as the minimum value of the function shown in formula (7).

The image-voice processing apparatus 10 uses any one of these methods to find the similarity of two segments as that of signatures based on r segments. And the image-voice processing apparatus 10 relies on the similarity among similar segments to determine whether such segments should be grouped together or not.

In so doing, the image-voice processing apparatus 10 can group together a certain set of video data including the program and frames independently from the height in hierarchy.

As described above, the image-voice processing apparatus 10 shown as a mode of carrying out this invention automatically extracts signatures in various layers of video data and compares the similarity of two signatures to compare the similarity between the segments corresponding thereto. This image-voice processing apparatus 10 enables to group together segments in various layers of video data, and can be applied to different types of video data. Thus, the image-voice processing apparatus 10 can be a general-purpose tool for automatically detecting and extracting any structure of video data.

It should be noted in passing that this invention is not limited to the mode of carrying out mentioned above. For example, the feature used in grouping together mutually similar sub-segments can obviously be other than those mentioned above. In other words, in this invention, it is sufficient that mutually related sub-segments can be grouped together based on certain information.

And needless to say this invention can be modified as the circumstances require to an extent consistent with the purpose of this invention.

Industrial Applicability

As described in details above, the signal processing method related to this invention is a signal processing method that extracts signatures defined by the representative segments which are sub-segments representing the contents of segments and the weighting functions that allocate weight to these representative segments, and comprises a group selection step that selects object groups of signatures from among the groups obtained by classifying based on an arbitrary attribute of sub-segments, a representative segment selection step that selects a representative segment from among the groups selected at this group selection step and a weight computing step that computes the weight of the representative segment obtained at this representative segment selection step.

Therefore, the signal processing method relative to this invention can extract signatures related to segments, and can use such signatures to compare the similarity among mutually different segments independently of the hierarchy of segments in signals. Accordingly, the signal processing method related to this invention can search segments having desired contents based on similarity from among segments of various layers in various signals.

And the image-voice processing apparatus related to this invention is an image-voice processing apparatus that extracts signatures defined by the representative segments which are image and/or voice sub-segments representing the contents of image and/or voice segments from among the image and/or voice sub-segments contained in the image and/or voice segments constituting the video signals supplied and a weighting function that allocates weights to these representative segments and comprises an execution means that selects object groups of signatures from among the groups obtained by a classification based on an arbitrary attribute of image and/or voice sub-segments, selects a representative segment from among these selected groups and computes the weight of the representative segment obtained.

Therefore, the image-voice processing apparatus related to this invention can extract signatures related to image and/or voice segments, and can use these signatures to compare the similarity among image and/or voice segments irrespective of the hierarchy of mutually different image and/or voice segments. Accordingly, the image-voice processing apparatus related to this invention can search image and/or voice segments having the desired contents based on similarity from among image and/or voice segments of various layers in various video signals.

What is claimed is:

1. A signal processing method that extracts signatures defined by the representative segments which are sub-segments that represent the contents of segments constituting signals supplied out of the sub-segments contained in said segments and a weighting function that allocates weights to these representative segments, said signal processing method comprising:

a group selection step that selects object groups for said signatures out of the groups obtained by a classification based on an arbitrary attribute of said sub-segment;

a representative segment selection step that selects a representative segment out of the groups selected in said group selection step; and a weight computing step that computes the weight for the representative segment obtained in said selection step, wherein the results of comparison obtained by comparing the similarity of each representative segment of mutually different segments and the weight given to each representative segment computed in said computing step are used to compare the similarity of mutually different segments.

2. A signal processing method according to claim 1 further comprising:

a segment fragmentation step that fragments said segment into a plurality of sub-segments that will be candidates for said representative segments; and a grouping step that classifies and groups said sub-segments based on the mutual similarity for said attribute from among the sub-segments obtained in said segment fragmentation step; and wherein said group selection step selects arbitrary object groups for said signatures from out of the groups obtained through said segment fragmentation step and said grouping step.

3. A signal processing method according to claim 1 wherein said signals are at least one of image signals and voice signals contained in video data.

4. A signal processing method according to claim 1 wherein said weight computing step computes said weight based on the total number of sub-segments contained in the groups corresponding to the representative segments.

5. A signal processing method according to claim 1 wherein said segments constitute an arbitrary stream of said signals.

6. A signal processing method according to claim 1 wherein said sub-segments constitute an arbitrary stream contained in said segments.

7. A signal processing method according to claim 1 wherein said segments constitute a scene consisting of segments formed by a stream of successive frames or chronologically successive segments forming part of said signal.

8. A signal processing method according to claim 1 wherein said segments constitute a program representing the whole of the frames constituting said signals or said signals.

9. An image-voice processing apparatus that extracts signatures defined by the representative segments which are image and/or voice sub-segments that represent the contents of image and/or voice segments constituting video signals supplied out of the image and/or voice sub-segments contained in said image and/or voice segments and a weighting function that allocates weight to these representative segments, said image-voice processing apparatus comprising:

means that selects object groups for said signatures out of the groups obtained by a classification based on an arbitrary attribute of said image and/or voice sub-segments, means that selects a representative segment out of these selected groups; and means that computes a weight for the representative segment obtained thereby, wherein the results of comparison obtained by comparing the similarity among the respective representative segments of mutually different image and/or voice segments and the weight given to each representative segment are used to compare the similarity among mutually different image and/or voice segments.

10. An image-voice processing apparatus according to claim 9 wherein said image and/or voice segments are divided into a plurality of image and/or voice sub-segments which will be candidates for said representative segments, said image and/or voice sub-segments are classified and grouped together based on their mutual similarity as said attribute from among the image and/or voice sub-segments obtained thereby, and arbitrary groups to be objects of said signatures are selected.

11. An image-voice processing apparatus according to claim 9 wherein said weight is computed based on the total number of image and/or voices sub-segments contained in groups corresponding to the representative segments.

12. An image-voice processing apparatus according to claim 9 wherein said image and/or voice segments are an arbitrary stream of said video signals.

13. An image-voice processing apparatus according to claim 9 wherein said image and/or voice sub-segments are an arbitrary stream contained in said image and/or voice segments.

14. An image-voice processing apparatus according to claim 9 wherein said image and/or voice sub-segments constitute a scene consisting of a stream of successive image and/or voice frames constituting said video signals or chronologically successive image and/or voice segments.

15. An image-voice processing apparatus according to claim 9 wherein said image and/or voice sub-segments are image and/or voice frames constituting said video signals or a program representing the whole video signals.

* * * * *